Feb. 28, 1950 L. HAMMOND Re. 23,200

ELECTRICAL MUSICAL INSTRUMENT

Original Filed Nov. 26, 1943 3 Sheets-Sheet 1

Inventor
Laurens Hammond
By Benjamin F. Wupper
Atty.

ELECTRICAL MUSICAL INSTRUMENT

Original Filed Nov. 26, 1943 3 Sheets-Sheet 2

Inventor
Laurens Hammond
By Benjamin F. Nupper
Atty.

ELECTRICAL MUSICAL INSTRUMENT
Original Filed Nov. 26, 1943 3 Sheets-Sheet 3
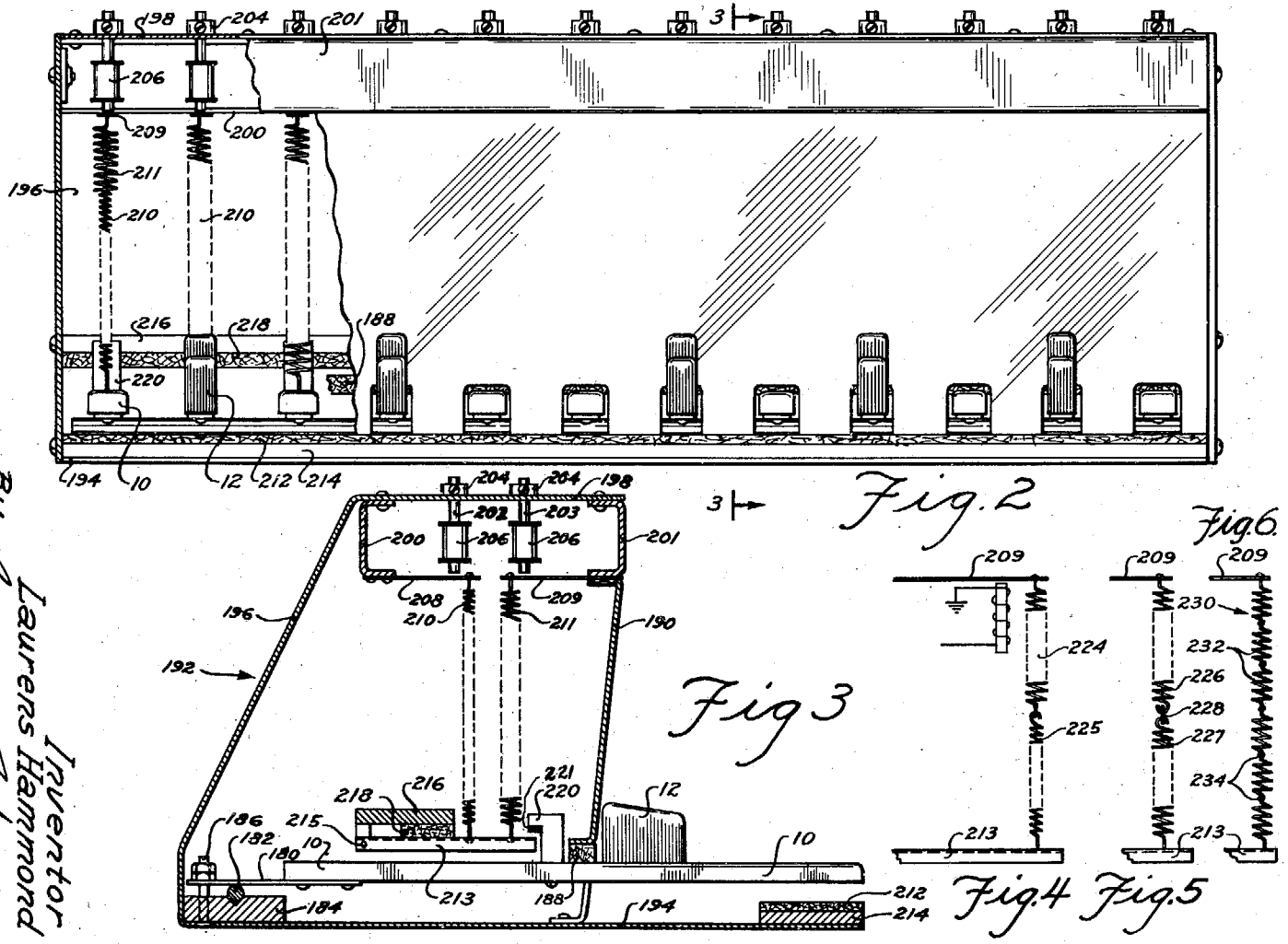
Inventor
Laurens Hammond
By Benjamin F. Hupper
Atty.

Reissued Feb. 28, 1950

Re. 23,200

UNITED STATES PATENT OFFICE 23,200

ELECTRICAL MUSICAL INSTRUMENT

Laurens Hammond, Chicago, Ill., assignor to Hammond Instrument Company, Chicago, Ill., a corporation of Delaware Original No. 2,480,131, dated August 30, 1949, Serial No. 511,795, November 26, 1943. Application for reissue September 28, 1949, Serial No. 118,221

17 Claims. (Cl. 84—1.14)

Matter enclosed in heavy brackets [ ] appears in the original patent but forms no part of this reissue specification; matter printed in italics indicates the additions made by reissue My invention relates generally to electrical musical instruments and more particularly to improved means for generating electrical signals corresponding to musical tones.

It is an object of my invention to provide improved electrical signal generators for musical instruments which are capable of producing musical tones of complex quality and containing a large number of the higher harmonics in substantial amplitude.

A further object is to provide an improved electrical musical instrument which may be operated by means of a pedal clavier, and in which the intensity of the tones produced is responsive to the velocity of pedal depression.

Other objects will appear from the following description, reference being had to the accompanying drawings in which:

Figures 1a and 1b together constitute a wiring diagram of the instrument and also include a vertical sectional view of the pedal action;

Figure 2 is a front elevational view of a modified form of the invention;

Figure 3 is a transverse sectional view taken on the line 3—3 of Fig. 2; and

Figures 4, 5 and 6 are fragmentary details showing modified forms of generator springs.

Figure 1A:
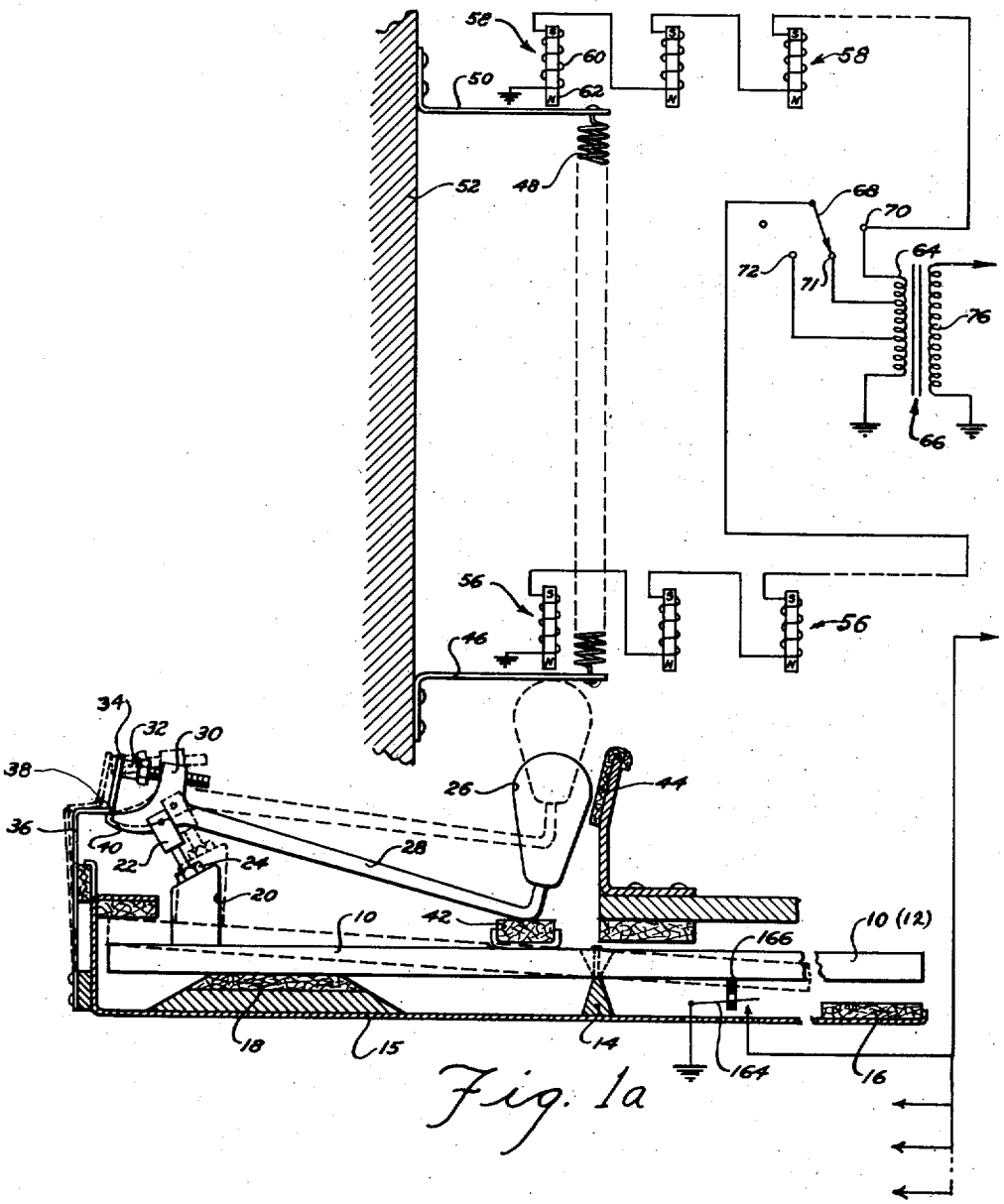
Figure 16:
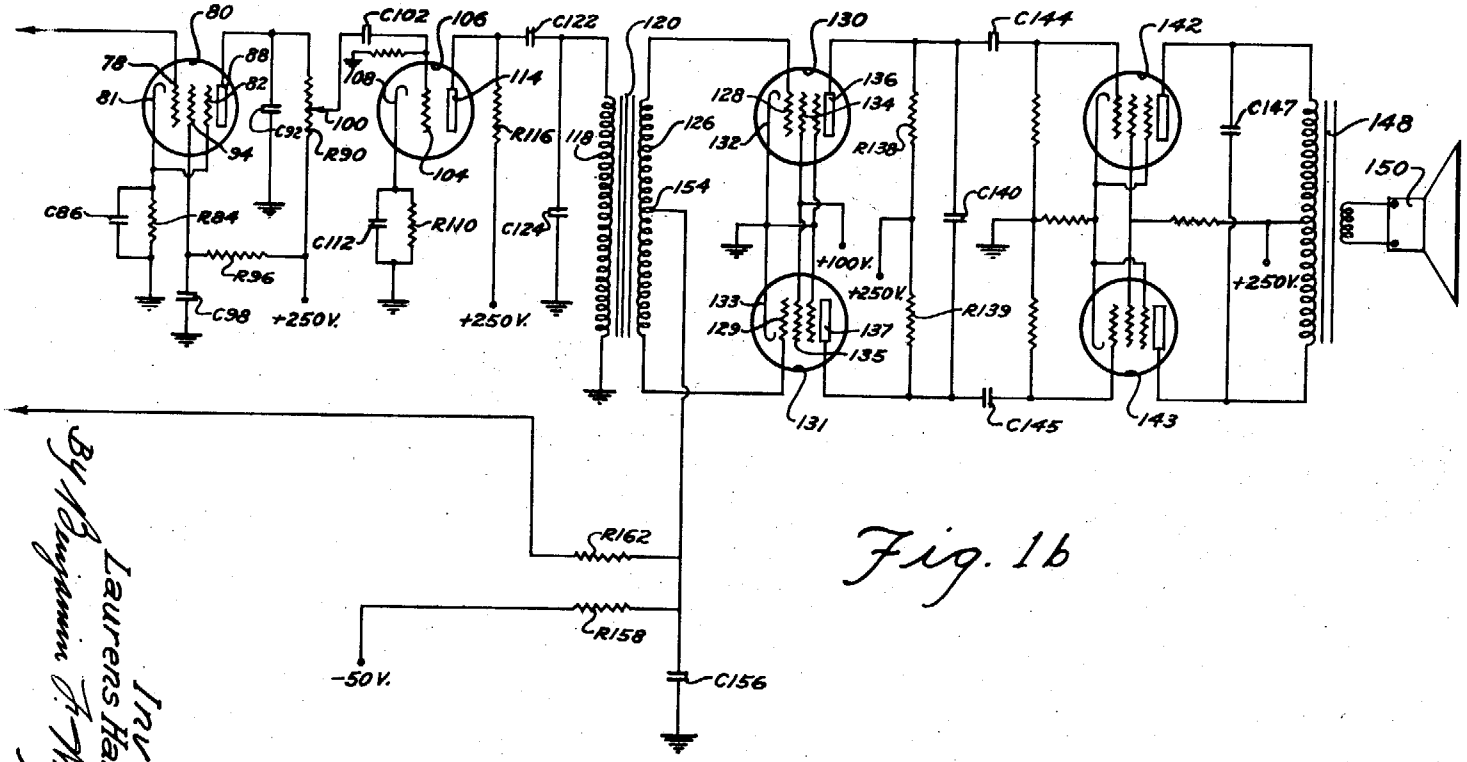

Referring to Figs. 1a and 1b the invention is diagrammatically illustrated as incorporated in a pedal-operated instrument comprising a plurality of "natural" pedals 10 and "sharp" pedals 12 extending throughout a limited range, such as an octave. These pedals are mounted for pivotal movement on a fulcrum 14 carried by a base 15, and are operable through the range indicated by the dotted lines in Fig. 1a, the extent of the depression of the keys being limited by a strip 16 of felt or the like. The pedals may be returned to normal position from their dotted line position either by gravity as illustrated in Figs. 1a and 1b, or by resilient means, such as the leaf spring 180 shown in Fig. 3, the pedals being shown in full lines in their normal positions, in which they rest upon a stop 18 of felt or similar material.

Each of the pedals 10, 12 carries a member 20 into which a pivot stud 22 is threaded, this stud being secured in adjusted position by a lock nut 24. A hammer 26 is carried at the end of a shank 28, the shank terminating in a butt portion 30 pivoted to the stud 22. An adjustable escapement button 32 is threaded in the butt 30 and is adapted to engage the upward extension 34 of a resilient latch 36, the latter having a shoulder 38 forming a bearing surface for a rearwardly extending ear 40 of the butt 30.

The hammer shanks 28 normally rest against a felt padded action rail 42. A hammer check 44 is positioned to check the return fall of the hammers.

This action is similar to well known piano actions and operates in a well known manner. When the pedal is depressed the raising of the rearward end of the pedal causes the hammer to swing about the shoulder 38 as a pivot until the button 32 strikes the latch extension 34 whereupon the resilient latch is flexed to its dotted line position permitting the hammer to rebound freely and come to a temporary rest position against the check 44, the parts being returned to their normal position shown in Fig. 1a upon release of the depressed pedal. In lieu of the action described any other suitable simple piano type action may be used.

Each of the hammers 26 is positioned to strike one of a plurality of brackets 46, which form the lower anchorages for helical springs 48, the upper end of each of these springs being secured to a complementary bracket 50. The brackets 46 and 50 are secured to a rigid plate 52. The plate 52 is suitably secured to the base plate 15.

Above each of the brackets 46 there is an electromagnetic pickup 56, while similar electromagnetic pickups 58 are located above the brackets 50. Each of these pickups comprises a coil 60 surrounding a permanent magnet 62. The coils 60 of the pickups 58 are connected in series between ground and one end of the primary winding 64 of an input transformer 66, while the windings of the pickups 56 are connected in series between ground and a switch arm 68 cooperable with contact points 70, 71 and 72, the latter being respectively connected to the ungrounded terminal of the primary winding 64 and intermediate taps thereof. The secondary winding 76 of the transformer 64 has one terminal thereof grounded and its other terminal connected to the control grid 78 of a preamplifier tube 80 which may be a pentode of the 6J7G type.

The cathode 81 of the tube 80 is connected to its suppressor grid 82 and is connected to ground through a self-bias resistor R84 and a by-pass condenser C86. The plate 88 of the tube 80 is connected to a suitable source of plate voltage, indicated as a terminal +250 v., through a potentiometer load resistance R90. The plate 88 is connected to ground through a filter condenser C92 while the screen grid 94 is connected to the +250 v. terminal through a voltage dropping resistor R96, and is connected to ground through a filter condenser C98.

A slider 100 cooperable with the potentiometer resistance R90 forms a volume control and is connected through a blocking condenser C102 to the grid 104 of a triode 106 which may be of the 6J5G type. The cathode 108 of the triode 106 is connected to ground through a self-bias resistor R110 and by-pass condenser C112 while the plate 114 of this tube is connected to a suitable plate current source indicated as a terminal +250 v. through a load resistor R116. The output of the triode 106 is transmitted to the primary winding 118 of a coupling transformer 120 through a blocking condenser C122, the primary winding being shunted by a filter condenser C124.

The terminals of the secondary 126 of the transformer 120 are respectively connected to the grids 128, 129 of amplifying and control pentodes 130, 131 forming the first stage of a push-pull amplifier. The cathodes 132, 133 as well as the suppressor grids thereof are connected to ground while the screen grids 134, 135 are connected to a suitable potential source indicated as a terminal +100 v. The plates 136, 137 of the pentodes 130, 131 are connected through load resistors R138, R139 to a plate voltage source illustrated as a terminal +250 v. and the two plates are coupled through a filter condenser C140. The outputs of these tubes 130, 131 are coupled to the input of push-pull amplifier pentodes 142, 143 through blocking condensers C144 and C145 respectively. The output of the push-pull amplifier tubes 142, 143 is supplied through an output transformer 148 to a speaker 150. The pentodes 130 and 131 are preferably of the 6K7G type, while tubes 142 and 143 may be of the 6K6G type.

The condensers C86, C102, C112, C144 and C145 are of such values relative to the parameters of the amplifying system that frequencies below those of the lowest pitch musical tone to be produced are appreciably attenuated, thus substantially eliminating from the output of the amplifier low frequency thumps, produced in the pick-up coils incidental to the hammers 26 striking the armatures or supports 46. Condensers C92, C124, C140 and C147 are of such values as to limit the voltage for the suppression of undesirable high frequency harmonics and distortion terms. In addition the gain of the amplifying system is controlled in the following manner.

The center tap 154 of the secondary winding 126 is connected to ground through a condenser C156 and is connected to a source of cutoff bias potential, indicated as a terminal −50 v., through a decay resistor R158.

The center tap 154 is adapted to be connected to ground upon the depression of any one of the pedals through an attack resistor R162 and one of a plurality of switches 164. There is a switch 164 arranged beneath each of the pedals 10, 12 and resiliently biased to close upon the depression of its associated pedal, the switch being held in open position, when the pedal is in its undepressed position, by an insulating actuator 166 attached to each of the pedals. The switches and their actuators are so arranged that the hammer 26 will strike its associated bracket 46 just prior to the closure of the switch 164. Thus the transients due to the striking of the hammer against the bracket 46 are not transmitted to the speaker 150 because the girds of the push-pull control tubes 130, 131 are maintained at cutoff potential by virture of their connection to the −50 v. terminal through the resistor R128.

When a key is depressed and its hammer strikes the bracket 46 the connected spring 48 is shock-excited into vibration. This spring will transmit the shock wave at a velocity which is dependent upon the physical dimensions of the spring, and upon the properties of the wire of which it is made. The spring is preferably made of piano steel wire. The ends of the spring are hooked to the brackets 46 and 50 and are under sufficient tension that the shock impulse imparted by the hammer is imparted to the lower end of the spring, and progresses upwardly, the wave being substantially completely reflected at the junction of the upper end of the spring and the bracket 50. This reflection is nearly complete because of the impedance mismatch between the spring and the brackets 46, 50. Obviously some of the energy transmitted by the spring is transferred to the brackets 46 and 50 and they are thus moved sufficiently to excite the pickups 56, 58.

It will be noted that the impulses transmitted back and forth by the spring strike the brackets 46 and 50 in 180 degrees out of phase relation. Thus when the switch 68 is positioned to engage contact 70 the signal impressed upon the primary winding 64 is effectively twice that of the frequency generated by the spring and thus the tone produced is effectively an octave higher than when only the pickups 58 are coupled to the output. By shifting the switch 68 to connect to one of the intermediate taps of the transformer winding 64, the degree of such octave coupler effect may be adjusted whereas when such coupler effect is not desired the switch 68 may be adjusted to its off position, thus utilizing only the pickups 58 for the generation of the signal.

The operation of the coil springs 48 as tone generators differs materially from the generation of musical tones by piano and similar strings, for in the latter the vibrations are transverse, whereas in the coil springs the waves are compressional. The springs 48 have the desirable characteristic that the shock wave is transmitted and reflected in a linear manner, resulting in the production of desirable harmonic and enharmonic partials.

The springs 48 operate in the manner of a transmission line. The frequencies generated are substantially independent of the tension on the springs. The tension should be sufficient merely to prevent contact of adjacent turns and to maintain the ends of the springs in firm contact with the armature supports 46, 50.

The vibration transmission characteristics of springs, of the type utilized in my invention, are set forth in the patent to R. L. Wegel, No. 1,852,795, in which the following formula for the velocity of transmission is given:

$$v_1=\frac{ap_1}{2\pi R^2}\sqrt{\frac{\mu}{2\rho}}$$

in which:

$v_1$=the linear velocity of transmission of compressional waves;
a=the radius of the wire;
$p_1$=the pitch of the winding under tension;
R=the radius of the helix to the center of the wire;
$\mu$=the sheer modulus of elasticity; and
$\rho$=the density of the material of the wire.

With a spring having the variables of the foregoing formula of given value, the fundamental frequency (f) generated will depend solely upon the length (L) of the spring in accordance with the relation: $f=v_1/L$.

Thus there is practically no tendency for the springs to get out of tune. Assuming that the springs are protected against corrosion, they should maintain their respective musical pitches indefinitely.

By virtue of the fact that the spring is shock excited at its extremity, the tones produced are of high harmonic development, generally with the harmonics decreasing progressively in amplitude. Furthermore, as the tones decay, the higher harmonics decay more rapidly than the fundamental. This effect is pleasing and is common to the tones of the piano and other percussive and plucked string instruments.

The character of the armatures or spring supports 46, 50 will determine, in part, the quality and decay rate of the tone produced. These supports should be relatively stiff and should be firmly attached to the plate 52, while the latter should be rigid and have considerable mass.

In modified forms of the invention the torsional wave transmission characteristics of coil springs may be utilized, but, in general, the mechanical structures for producing and picking up such torsional waves are not as simple as the structures required for producing and picking up compressional waves, and instruments utilizing compressional waves in the springs are therefore preferred.

In the embodiment of the invention disclosed in Figs. 2 and 3 the piano key action is not employed and the construction of the instrument thus considerably simplified. In this embodiment of the invention the "natural" keys 10 and "sharp" keys 12 are respectively secured to leaf springs 180 which rest upon a fulcrum rod 182, the leaf springs having their ends anchored to a cross bar 184 by means of adjustable bolts 186. The leaf springs 180 normally hold the pedals 10 and 12 in engagement with an up-stop strip 188, of felt or the like, which is secured to the front wall 190 of the instrument case. The remainder of the case is formed by a single sheet 192 which is bent to form a base plate 194, an inclined rear wall 196 and a top 198. A pair of opposed channels 200, 201 are riveted to the top 198, the channel 201 also being riveted to the front wall 190. A plurality of pickup magnets 202, 203 are adjustably secured in bushings 204 which are secured to the top 198, the pickup magnets 202, 203 carrying pickup coils 206.

Spring supports 208, 209 are riveted respectively to the lower flanges of channels 200, 201 so as to lie adjacent the lower ends of the magnets 202, 203. Coil springs 210, 211 are respectively hooked to the supports 208 and 209 at their upper ends and their lower ends are hooked to one of a plurality of pivoted arms 213. The arms 213 are preferably made of an aluminum or magnesium alloy and are preferably channel-shaped to secure maximum strength with minimum mass. The arms 213 are pivoted on a rod 215 carried by a fixed rail 216, and are normally held against a soft felt stop 218 carried by the rail 216. Each of the pedals 10, 12 has an inverted L-shaped hammer 220 secured thereto, these hammers being of substantial mass. To prevent the generation of tones in which the very high harmonics predominate, the hammer 220, if made of metal, may have a thin pad 221 of softer material, such as leather, secured to its striking face.

It will be noted that the springs 210, 211 are shown as being of different diameters to illustrate that they differ from one another and will generate tones of different pitch. It will be understood that the springs may be of different lengths or that other of their physical properties may differ to cause them to generate tones of different fundamental pitch. It will be assumed that the springs 210 and 211 have such different physical properties that they will generate tones of octavely related pitch.

Upon depression of one of the pedals 10, 12 its hammer 220 strikes the underlying end of its associated arm 213 and swings the latter away from the damping stop 218. The striking of the hammer 220 against the arm 213 shock-excites the springs 210, 211, the amplitudes of the compressional waves produced in these springs being dependent upon the velocity of pedal depression. As long as the pedal is held depressed, the compressional waves will be reflected at the lower ends of the springs, since the hammer 220 has sufficient mass and rigidity to provide a point of considerable reflection. The supports 208, 209 are of sufficient stiffness and the channels 200, 201 are of sufficient mass and rigidity that reflection of a high percentage of the energy of the wave also takes place at the upper ends of the springs.

Since the springs 210, 211 generate tones differing in pitch by an octave and the signals produced thereby are combined in the output circuit of the instrument, it will be apparent that the musically desirable octave coupler effect is obtained.

The degree of octave coupler effect may be determined by adjustment of the spacing of the lower ends of the pickup magnets 202, 203 from the spring supports 208, 209 respectively. Furthermore, the quality of the musical tones produced may be controlled by well known means for modifying electrical signals in the amplifier and output system of the instrument.

The pickup coils 206 may be coupled directly to an amplifying and electroacoustic translating system such as a public address system, or may be coupled in the manner shown in Figs. 1a and 1b to an amplifier and speaker individual to the instrument. The volume control is not absolutely essential, since the intensity of the tones may be determined, within a fairly wide range, by the velocity of pedal depression.

Although only two springs are illustrated as being attached to each of the pedals 10, 12, it may be desirable in some instances to employ more than two springs so as to produce chordal effects. Furthermore, the transmission characteristics of the springs may be varied by the addition of suitable lumped impedances to provide additional points of reflection within the spring itself and thereby alter the harmonic content of the tones produced.

Several such variations in the form of the springs are illustrated in Figs. 4, 5, and 6. In Fig. 4 the spring transmission line comprises two springs 224, 225 of the same wave propagation velocities which are hooked together between an upper support 209 and an arm 213. This combination of springs will produce an octave coupler effect, since the junction between the two springs provides an additional point of partial reflection, due to the impedance mismatch of the two springs. The degree of impedance mismatch of the two springs will affect the relative intensities of the fundamental and octave tones.

In Fig. 5 the generator comprises two similar springs 226, 227 connected together by a link 228 of substantial mass. The link 228 serves as a frequency selective point of partial reflection of the compression waves with the result that the tone produced will be of different quality than if the springs 226, 227 were formed as a single integral spring. The link 229 tends to pass the lower frequencies and to reflect the higher frequencies. Since the impedance of link 228 varies with the frequency, certain harmonics will be intensified more than others. The tone produced will have a characteristic initial tone quality and its quality will change as the tone decays due to the more rapid attenuation of the higher frequencies. In this respect the tones will be similar to those of the piano and to the tones of other percussive mechanical musical instruments in which the tones have substantial decay periods.

In Fig. 6 the generator comprises a spring 230 having a purality of sections 232. Small masses 234 of solder or the like are secured to the spring at the junctions of the sections 232 to provide a plurality of points of reflection for the compressional waves. The size of the masses 234 will determine the character of the tones produced, that is, if the mass is small it will transmit more of the lower frequencies and reflect, to any appreciable extent, only the highest frequencies. As the weight of the mass is increased the lower frequencies are progressively transmitted less and reflected to a greater extent.

The sections 232 may be of equal or different lengths, or diameters, or both, and the masses 234 may be of equal or different sizes. By proper selection of these variables, any one of a wide variety of different tonal effects may be obtained.

While I have shown and described particular embodiments of my invention, it will be apparent to those skilled in the art that numerous modifications and variations may be made in the form and construction thereof, without departing from the more fundamental principles of the invention. I therefore desire, by the following claims, to include within the scope of my invention all such similar and modified forms of the apparatus disclosed, by which substantially the results of the invention may be obtained by substantially the same or equivalent means.

I claim:

1. In an electrical percussive tone musical instrument, the combination of a playing key, a pair of supports, a coil spring carried by said supports, key operated means to produce a single shock excitation of said spring for each key depression, thereby to cause compressional waves in said spring which are reflected by said supports and thus travel back and forth through said spring, and electrical means for sensing said waves and translating them successively into electrical impulses and into sound.

2. In an electrical percussive tone musical instrument, the combination of a pair of spaced armatures, a coil spring carried by and extending between said armatures, means to shock excite said spring to cause a compressional wave in said spring which is reflected by said armatures and thus travels back and forth through said spring, and an electical means adjacent each of said armatures for sensing said waves and translating them successively into electrical impulses and into sound.

3. In an electrical musical instrument, the combination of a playing key, a coil spring, means operated by the key to produce a single shock excitation of said spring upon each key depression to cause a compressional wave therein, means to support said spring for substantially complete reflection of compressional waves at the ends thereof, and electrical means for sensing the vibrations in said spring.

4. In an electrical musical instrument for the production of percussive musical tones, the combination of a coil spring, means to shock excite said spring to cause a vibrational wave therein, means to support said spring at both ends for substantially complete reflection of waves at the ends thereof, an electrical means at each end of said spring for sensing the vibrations thereof, and means for selectively utilizing the output of said electrical sensing means.

5. In an electrical musical instrument, the combination of a helical coil spring, means supporting said spring at at least one end thereof, means capable of imparting a single blow to said spring to produce a wave repeatedly traversing said spring by being reflected at the ends thereof, and an electrical pickup located adjacent said spring and capable of translating the waves therein into electrical waves.

6. In an electrical percussive tone musical instrument, the combination of a helical coil spring, means supporting said spring at at least one end thereof, means capable of imparting a single blow to one end of said spring to produce a compressional wave repeatedly traversing said spring by being reflected at the ends thereof, and an electrical pickup located adjacent said spring and capable of translating the compressional waves therein into electrical waves.

7. In an electrical percussive tone musical instrument including amplifying and electroacoustic translating means, the combination of a plurality of keys for operation by the player, a plurality of coil springs associated respectively with said keys, means operated by said keys to apply a single shock excitation thereto upon each operation of the key and of degree responsive to velocity of key operation, electrical pickup means associated with said springs, and means coupling said pickup means to the amplifying and electroacoustic translating means.

8. In an electrical percussive tone musical instrument including amplifying and electroacoustic translation means, the combination of a plurality of pedally operated keys, a plurality of coil spring associated respectively with said keys, means operated by said keys to apply a shock excitation to the extremities of said springs of degree responsive to velocity of key operation to produce compressional waves in said springs, there being but a single shock applied to a spring upon each operation of a key, electrical pickup means associated with said springs, and means coupling said pickup means to the amplifying and electroacoustic translating means.

9. In an electrical percussive tone musical instrument having a signal transmission system terminating in electroacoustic translating means, the combination of a plurality of supports, a pedal, stops for limiting the extent of movement of said pedal, a light weight pivoted arm, a plurality of coil springs of different dimensions, each of said springs having one end connected to one of said supports and all of said springs having their other ends connected to said arm, a hammer carried by said pedal and operative to strike the free end of said arm upon depression of the pedal, and electrical pickup means cooperating respectively with said supports and coupled to said signal transmission system.

10. In an electrical musical instrument for playing bass accompaniment tones and having an output system including an amplifier and electroacoustic translating means, the combination of a plurality of pedals, a plurality of coil springs, at least one for each of said pedals, means supporting at least one end of each of said springs, means operated by said pedals to shock excite said springs to produce compressional waves therein, said means operating to produce a single shock-excitation of its associated spring for each pedal depression, and mechanico-electric translating means responsive to the waves in said springs and coupled to said output system.

11. In an electrical musical instrument, the combination of a coil spring, a manually operable key to produce a single shock-excitation of said spring by a blow at one end of the spring directed longitudinally of the spring to produce [to] *a* compressional wave therein and means for electrically sensing the waves produced in said spring by such shock excitation.

12. The combination set forth in claim 11 in which said coil spring is divided into a plurality of sections with means providing points of reflection between the sections.

13. The combination set forth in claim 11 in which said coil spring is in a plurality of sections of differing dimensions so as to have different velocities of wave transmission.

14. The combination set forth in claim 11 in which said coil spring is in two equal sections, and in which the sections are joined by means providing points of wave reflection.

15. The combination set forth in claim 11 in which the coil spring is tensioned between a resilient arm and a movable arm, in which said manually controllable means strikes the movable arm, and in which the sensing means is responsive to vibrations of the resilient arm.

16. A percussive musical tone signal generating apparatus for electrical musical instruments, comprising a coil spring system incorporating means for reflecting compressional waves, said means being located to cause the system to produce a wave corresponding to two complex musical tones in octave relationship, means to produce a single shock-excitation of said coil spring system upon each key depression to initiate compressional waves therein, and electrical pickup means located adjacent the spring system so as to be responsive to the compressional waves therein.

17. Apparatus for generating a signal corresponding to a percussive musical tone comprising, a pair of spaced stiff resilient supports, a helically coiled spring having its ends respectively held by said supports, a pair of electrical pickup elements, one adjacent each of said supports to be affected by the vibration of the supports respectively, an output system, means to couple both of said pickup elements to the output system, and means to vary the effectiveness of the coupling of one of the pickup elements to the output system.

LAURENS HAMMOND.

REFERENCES CITED

The following references are of record in the file of this patent or the original patent:

UNITED STATES PATENTS

| Number | Name | Date |
|---|---|---|
| 1,409,657 | Boynten | Mar. 14, 1922 |
| 2,187,251 | Severy | Jan. 16, 1940 |
| 2,254,284 | Hanert | Sept. 2, 1941 |
| 2,266,030 | Hammond | Dec. 16, 1941 |
| 2,286,587 | Sundt | June 16, 1942 |
| 2,321,366 | Demuth | June 8, 1943 |
| 2,357,191 | Hanert | Aug. 29, 1944 |